United States Patent
Uchiyama et al.

[11] Patent Number: 5,810,030
[45] Date of Patent: Sep. 22, 1998

[54] FLUID CONTROL SOLENOID VALVE

[75] Inventors: Hidetoshi Uchiyama, Nagoya; Shinsuke Miyazaki, Kariya; Akira Adachi, Okazaki; Yasuyoshi Yamada, Nagoya, all of Japan

[73] Assignee: Nippondenso Co., Ltd., Kariya, Japan

[21] Appl. No.: 652,353

[22] Filed: May 23, 1996

[30] Foreign Application Priority Data

May 23, 1995 [JP] Japan .................................. 7-123786
Mar. 13, 1996 [JP] Japan .................................. 8-055872

[51] Int. Cl.$^6$ .................................................. F16K 31/06
[52] U.S. Cl. ...................................... 137/468; 251/129.07
[58] Field of Search ........................ 137/468; 251/129.07, 251/129.17

[56] References Cited

U.S. PATENT DOCUMENTS

| | | | |
|---|---|---|---|
| 2,491,905 | 12/1949 | Ray | 137/468 X |
| 2,966,170 | 12/1960 | Raulins | 137/468 |
| 3,319,649 | 5/1967 | Cummins | 251/129.07 |
| 3,606,241 | 9/1971 | Bornholdt | 251/129.07 X |

FOREIGN PATENT DOCUMENTS

| | | |
|---|---|---|
| 63-9789 | 1/1988 | Japan . |
| 4-331882 | 11/1992 | Japan . |
| 5-85749 | 12/1993 | Japan . |

*Primary Examiner*—Stephen M. Hepperle
*Attorney, Agent, or Firm*—Cushman Darby & Cushman Ip Group of Pillisbury Madison & Sutro LLP

[57] ABSTRACT

A fluid control solenoid valve includes a fluid passage having a valve seat therein. The solenoid valve further includes a bellows having a valve element and a retractable bellows portion continuous with the valve element. The valve element opens the fluid passage when lifted from the valve seat, and closes the fluid passage when seated onto the valve seat. A first spring urges the valve element in a valve lifting direction away from the valve seat, while a second spring urges the valve element in a valve seating direction toward the valve seat. An electromagnetic actuator is further provided for moving the valve element in the valve lifting direction, when energized. The first spring is interposed between an adjusting screw and the valve element. The adjusting screw is arranged to be extended at a high temperature so as to increase a biasing force of the first spring urging the valve element in the valve lifting direction. This prevents a sealing load, which is applied to the valve element to cause it to be seated onto the valve seat, from increasing. Increase in sealing load would be otherwise caused due to thermal expansion of the bellows portion at the high temperature.

9 Claims, 6 Drawing Sheets

FLUID CONTROL SOLENOID VALVE

BACKGROUND OF THE INVENTION

1. Field of the Invention

The present invention relates to a fluid control solenoid valve for controlling the fluid flow rate.

2. Description of the Prior Art

A proportional control valve has been used for controlling the air quantity bypassing a throttle valve so as to hold the idling speed of an engine constant.

Figure 7:
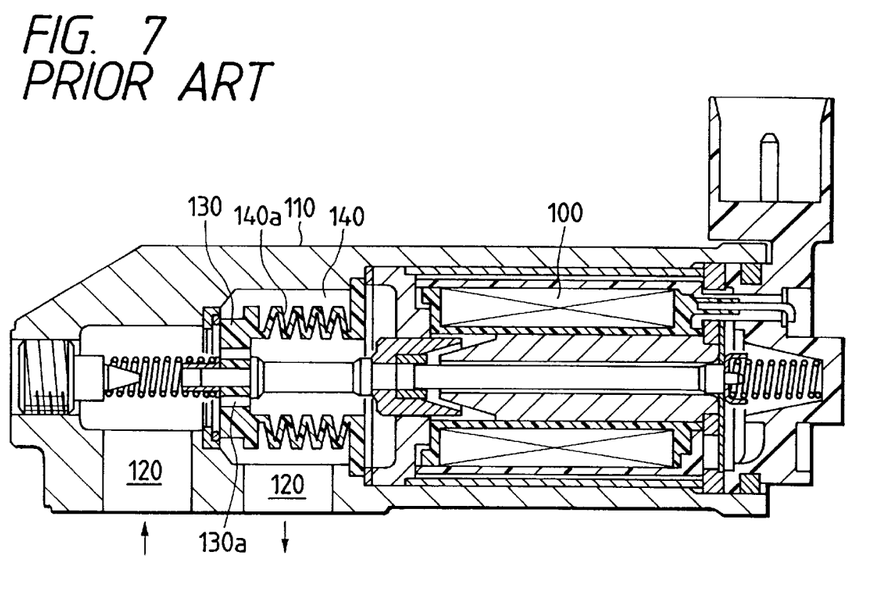
FIG. 7 is a sectional view showing a conventional proportional control valve.
Figure 8:
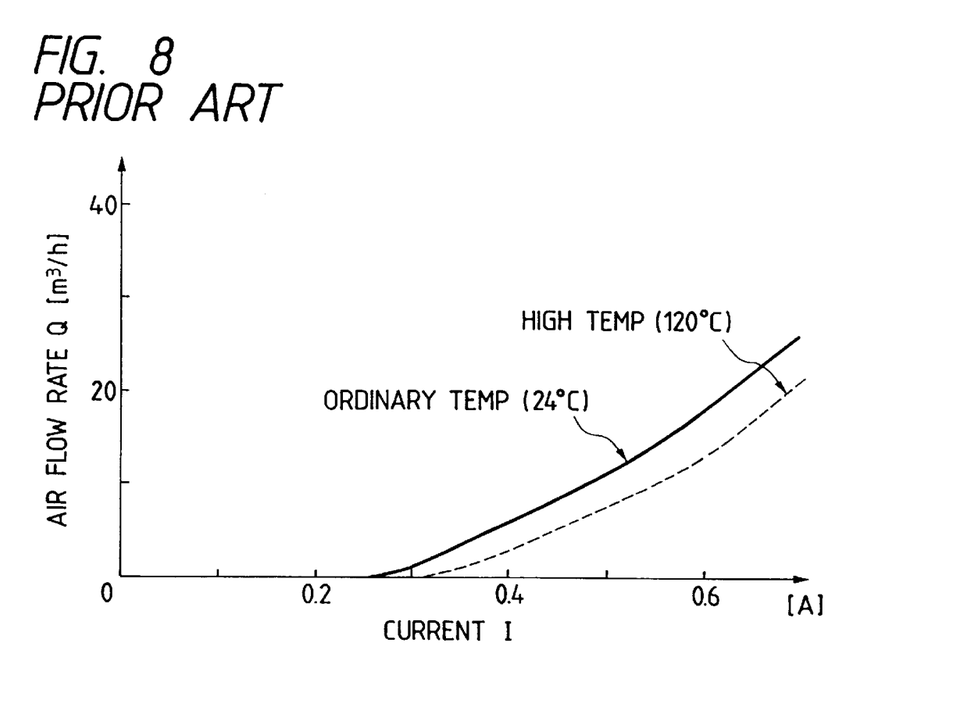
FIG. 8 is a graph showing the valve opening characteristics of the conventional proportional control valve at the ordinary temperature and the high temperature.

As shown in FIG. 7, for example, this proportional control valve includes a solenoid 100 for generating a magnetic force in response to energization, a bellows 140 having a valve element 130 for opening and closing an air passage 120 formed in a housing 110 and a bellows portion 140*a* integral with the valve element 130 and axially retractable, and others. The proportional control valve adjusts an open area of the air passage 120 by displacing the valve element 130 due to an electromagnetic attraction force generated corresponding to a magnitude of current flowing through the solenoid 100. Through holes 130*a* are formed in the valve element 130 for introducing pressures into the bellows 140 from the upstream side of the air passage 120. The bellows 140 works as a pressure cancelling mechanism. Specifically, by introducing the pressures into the bellows 140 as noted above, the pressures inside and outside the bellows 140 are approximately equalized so as to prevent a change in sealing load applied to the valve element 130 (load which causes the valve element 130 to close the air passage 120).

On the other hand, the proportional control valve used for controlling an intake air quantity for the engine is subjected to changes in operating temperature in the range of about −40° C.–120° C. Thus, particularly, the bellows portion 140*a* of the bellows 140 is subjected to elastic deformation due to the changes in operating temperature. As a result, the sealing load applied to the valve element 130 changes, for example, between the ordinary temperature (about 24° C.) and the high temperature (about 120° C.). As appreciated, the sealing load becomes greater at the high temperature than at the ordinary temperature. Thus, an opening degree of the valve element 130, that is, a valve lift magnitude, changes even when a value of current flowing through the solenoid 100 is unchanged. This results in large change of the air flow rate achieved through the air passage 120.

As described above, there has been a problem that the conventional proportional control valve can not properly control the flow rate due to the change in valve opening characteristic when subjected to the large change in operating temperature relative to the ordinary temperature.

SUMMARY OF THE INVENTION

Therefore, it is an object of the present invention to provide an improved fluid control solenoid valve.

According to one aspect of the present invention, a fluid control solenoid valve comprises a fluid passage having a first passage for introducing fluid, a second passage communicating with said first passage for discharging the fluid, and a valve seat provided in said fluid passage between the first and second passages; a bellows having a valve element for closing said fluid passage when seated on the valve seat and opening the fluid passage when separated from the valve seat, and a retractable bellows portion, the valve element and the bellows portion forming a pressure chamber into which a pressure of the first passage is introduced; a first biasing member for urging the valve element in a first direction away from the valve seat; a second biasing member for urging the valve element in a second direction toward the valve seat; a shaft for moving the valve element in the first or second direction; driving means for moving the valve element in the first direction via the shaft against a biasing force urging the valve element in the second direction; and load correcting means for correcting a load applied to the valve element so as to cause sealing loads to be approximately equal to each other at an ordinary temperature and at a temperature other than the ordinary temperature, the sealing load causing the valve element to be seated onto the valve seat.

It may be arranged that the temperature other than the ordinary temperature is a given high temperature.

It may be arranged that the temperature other than the ordinary temperature is a given low temperature.

It may be arranged that the load correcting means is deformed in a displacing direction of the valve element depending on a temperature change relative to the ordinary temperature so as to correct the load applied to the valve element from the first biasing member.

It may be arranged that the load correcting means adjusts a set load of the first biasing member.

It may be arranged that the load correcting means is a load receiving member for receiving the load, at a side of the valve element, from the first biasing member.

It may be arranged that the load receiving member is made of bimetal.

It may be arranged that the load correcting means is a plate spring made of bimetal, the bimetal plate spring supporting the shaft so as to be axially movable.

According to another aspect of the present invention, a fluid control solenoid valve comprises a fluid passage having a first passage for introducing fluid, a second passage communicating with the first passage for discharging the fluid, and a valve seat provided in the fluid passage between the first and second passages; a bellows having a valve element for closing the fluid passage when seated on the valve seat and opening the fluid passage when separated from the valve seat, and a retractable bellows portion, the valve element and the bellows portion forming a pressure chamber into which a pressure of the first passage is introduced; a first biasing member for urging the valve element in a first direction away from the valve seat; a second biasing member for urging the valve element in a second direction toward the valve seat; a shaft for moving the valve element in the first or second direction; driving means for moving the valve element in the first direction via the shaft against a biasing force urging the valve element in the second direction; and load correcting means for preventing a change in sealing load to be caused due to a change in temperature, by changing a load applied to the valve element depending on a temperature, the sealing load causing the valve element to be seated onto the valve seat.

BRIEF DESCRIPTION OF THE DRAWINGS

The present invention will be understood more fully from the detailed description given hereinbelow, taken in conjunction with the accompanying drawings.

In the drawings.

DESCRIPTION OF THE PREFERRED EMBODIMENT

Now, preferred embodiments of the present invention will be described hereinbelow with reference to the accompanying drawings. Throughout the figures showing the preferred embodiments, the same signs or symbols represent the same or like components.

[First Embodiment]

Figure 1:
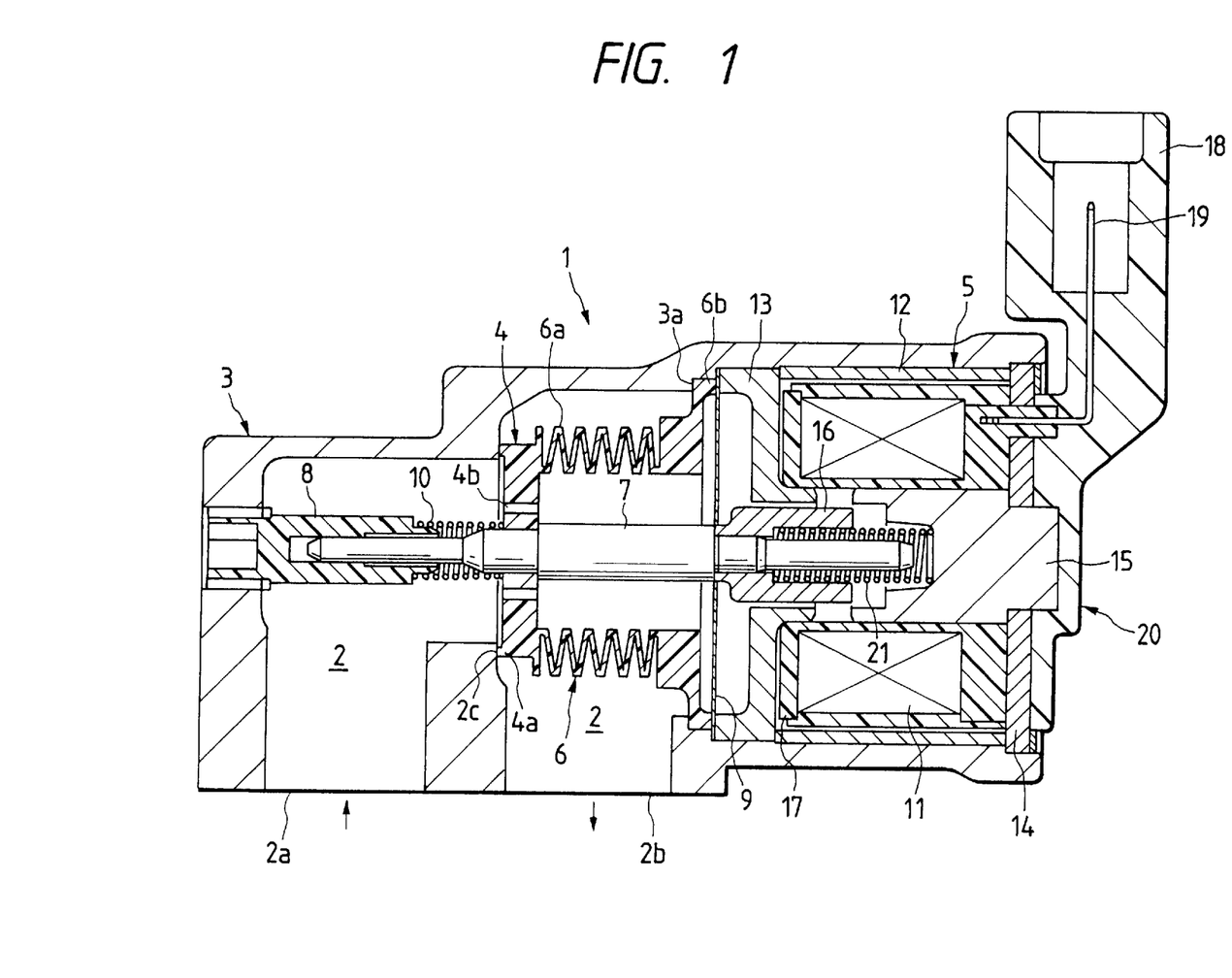
FIG. 1 is a sectional view showing the whole structure of a fluid control solenoid valve according to a first preferred embodiment of the present invention.

FIG. 1 is a sectional view showing the whole structure of a fluid control solenoid valve according to the first preferred embodiment.

The fluid control solenoid valve 1 of this embodiment is used for an engine idling speed control, and controls the air flow rate bypassing a throttle valve (not shown) during the engine idling. The solenoid valve 1 includes a housing 3 formed therein with an air passage 2. The housing 3 receives therein a valve element 4 for opening and closing the air passage 2 and a later-described electromagnetic actuator 5 for driving the valve element 4.

The housing 3 is made of die-cast aluminum and formed at its side with a flow inlet 2a of the air passage 2 and a flow outlet 2b of the air passage 2. The air passage 2 extends between the flow inlet 2a and the flow outlet 2b in an angular-C shaped fashion and includes therein a valve seat 2c for receiving thereon the valve element 4.

The valve element 4 is arranged in the air passage 2 downstream of the valve seat 2c. The valve element 4 has an outer peripheral edge which projects toward the valve seat 2c so as to form a sealing portion 4a relative to the valve seat 2c. The valve element 4 forms a later-described bellows 6 and is supported by a shaft 7 extending through the center thereof so as to be movable along with the shaft 7 in the axial direction thereof.

The shaft 7 has a tip portion slidably received in an adjusting screw 8 which is screwed into the housing 3 at its tip portion. The shaft 7 is supported at its rear side by a plate spring achieving the centering of the shaft 7.

The adjusting screw 8 is made of thermoplastic resin having a large linear expansion coefficient, such as PBT containing no reinforcing glass, and works to adjust a set load of a spring 10 interposed between the adjusting screw 8 and the valve element 4.

In this embodiment, an axial length of the adjusting screw 8 is set to, for example, about 23.0 mm at the ordinary temperature, which is greater than that of the ordinary adjusting screw. Further, the adjusting screw 8 is so set that an axial deformation magnitude thereof due to thermal expansion is large at the high temperature (for example, about 120° C.). Specifically, the length of the adjusting screw 8 extends to about 23.4 mm due to thermal expansion at an operating temperature of about 120° C., while the length thereof at the ordinary temperature is about 23.0 mm.

The spring 10 urges the valve element 4 in a direction to separate the sealing portion 4a of the valve element 4 from the valve seat 2c, that is, in a valve lifting direction.

The bellows 6 is made of, for example, ethylene tetrafluoride resin and includes a bellows portion 6a continuous with the valve element 4 and axially retractable and a flange portion 6b continuous with the bellows portion 6a. At the flange portion 6b, the bellows 6 is held, along with the plate spring 9, between a first plate 13 of the electromagnetic actuator 5 and a stepped portion 3a formed on the inner periphery of the housing 3. The bellows 6 works to cancel a pressure differential across the valve element 4, that is, a pressure differential between the upstream and downstream sides of the valve element 4, which pressure differential would be otherwise caused to affect a position of the valve element 4. The inside of the bellows 6 communicates with the air passage 2 via through holes 4b penetrating the valve element 4 in a thickness direction thereof. Thus, while the valve element 4 closes the air passage 2, air pressures upstream of the valve element 4 is introduced into the bellows 6 via the through holes 4b.

The electromagnetic actuator 5 is disposed in the housing 3 at the rear side of the plate spring 9. The actuator 5 includes a solenoid 11 for generating a magnetic force in response to energization, a cylindrical yoke 12 arranged around the solenoid 11, the first plate 13 arranged at the front side of the solenoid 11, a second plate 14 arranged at the rear side of the solenoid 11, a stator core 15 arranged at the inner periphery of the solenoid 11, and a moving core 16 arranged so as to confront the stator core 15 in an axial direction of the shaft 7.

The solenoid 11 is wound around the outer periphery of a cylindrical bobbin 17 made of, for example, nylon and energized via a terminal 19 molded in a connector 18. The connector 18 is formed integral with a cover 20 made of, for example, nylon and closing a rear end opening of the housing 3.

The yoke 12, the first plate 13, the second plate 14 and the stator core 15 are made of a magnetic material, such as iron, respectively, and form a fixed magnetic circuit or path of the solenoid 11.

The moving core 16 is press-in fixed to the shaft 7 at its rear end and received through the hollow center of the first plate 13. The moving core 16 is urged toward the adjusting screw 8, that is, in a valve seating direction to close the air passage 2, by means of a spring 21 interposed between the moving core 16 and the stator core 15. The moving core 16 is also made of a magnetic material, such as iron. When the solenoid 11 is energized, the moving core 16 is attracted toward the stator core 15, magnetized by the magnetic force generated by the solenoid 11, against the biasing force of the spring 21. A set load of the spring 21 is greater than that of the spring 10 so as to allow the valve element 4 to close the air passage 2 while the solenoid 11 is deenergized.

Now, an operation of the solenoid valve 1 having the foregoing structure will be described hereinbelow.

When the solenoid 11 is energized via an electronic control unit (not shown), the magnetic path is formed circulating from the stator core 15, through the second plate 14, the yoke 12, the first plate 13 and the moving core, and then to the stator core 15 so that an attraction force is generated between the stator core 15 and the moving core 16. By means of this attraction force, the moving core 16 is attracted toward the stator core 15 to reach a position where the biasing forces of the spring 10, the spring 21, the bellows 6 and the plate spring 9 are balanced. Thus, the shaft 7 and the valve element 4 are also moved toward the stator core 15, along with the moving core 16. As a result, the valve element 4, and thus its sealing portion 4a is lifted from the valve seat 2c to open the air passage 2 so that the air flows through the air passage 2 from the flow inlet 2a to the flow outlet 2b.

The air flow rate achieved through the air passage 2 changes by controlling a magnitude of current fed to the solenoid 11. Specifically, since the attraction force produced between the stator core 15 and the moving core 16 increases and decreases depending on the current fed to the solenoid 11, the air flow rate achieved through the air passage 2 can be controlled by controlling the current to the solenoid 11 to adjust a valve lift magnitude of the valve element 4.

In this embodiment, when an operating temperature of the solenoid valve 1 (a temperature of the air flowing in the air passage 2 or an external ambient temperature) reaches to a high temperature of, for example, 120° C., the bellows portion 6 of the bellows 6 is subjected to elastic deformation due to the high temperature. As a result, a load applied to the valve element 4 to urge it in the valve seating direction is increased at the high temperature than at the ordinary temperature.

Figure 2:
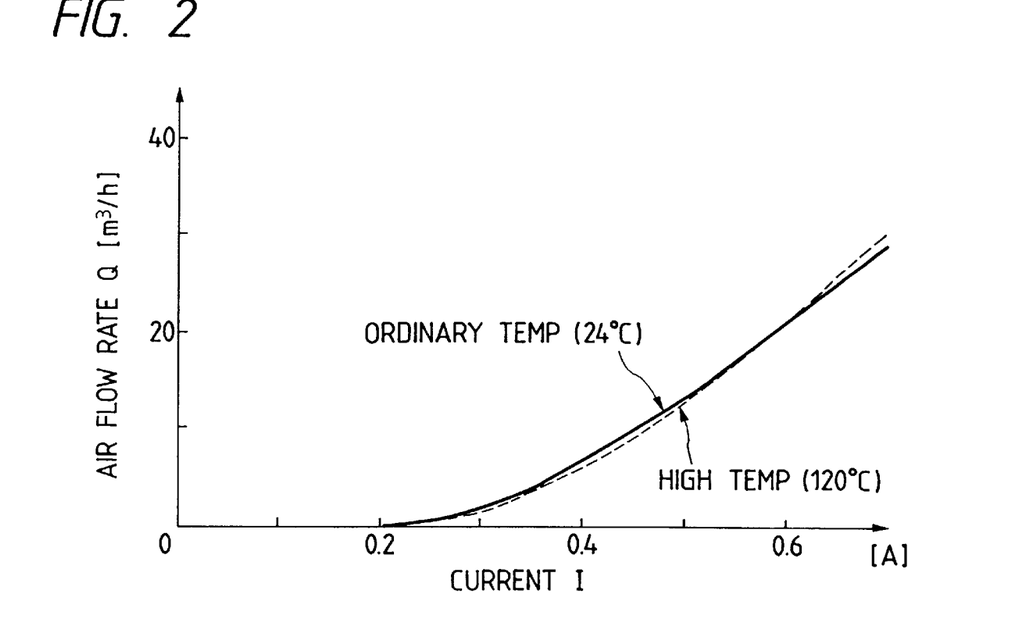
FIG. 2 is a graph showing the valve opening characteristics at the ordinary temperature and the high temperature according to the first preferred embodiment.

On the other hand, as described above, the adjusting screw 8 for adjusting the set load of the spring 10 is made of thermoplastic resin having a large linear expansion coefficient, and the axial length of the adjusting screw 8 is set large. Accordingly, the axial deformation magnitude of the adjusting screw 8 due to thermal expansion is large so that the length thereof at the high temperature is extended by about 0.4 mm as compared with the length thereof at the ordinary temperature. Thus, a load applied to the valve element 4 from the spring 10 interposed between the adjusting screw 8 and the valve element 4 (a load to urge the valve element 4 in the valve lifting direction) is increased than at the ordinary temperature. Accordingly, a variation of the load applied to the valve element 4 in the valve seating direction is offset or canceled by an increment of the spring load caused by the thermal expansion of the adjusting screw 8. Thus, a sealing load applied to the valve element 4 is not increased at the high temperature, and therefore is approximately equal to that at the ordinary temperature. As a result, the valve lift magnitudes of the valve element 4 relative to the constant current fed to the solenoid 11 are approximately equal to each other at the ordinary temperature and at the high temperature. Accordingly, as shown in FIG. 2, relationships between the current I to the solenoid 11 and the air flow rate Q are essentially equal to each other at the ordinary and high temperatures so that the air flow rate can be precisely controlled even at the high temperature like at the ordinary temperature.

When a difference between the air flow rates at the ordinary and high temperatures relative to the constant current to the solenoid is no greater than 10%, it is defined that the sealing loads at the ordinary and high temperatures are approximately equal to each other.

Figure 3:
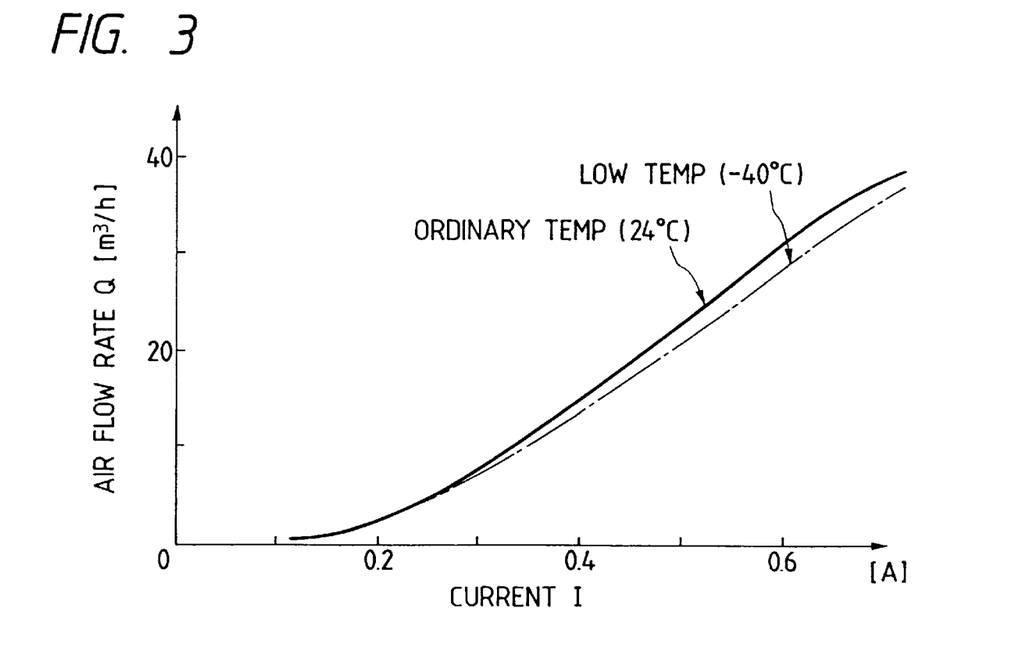
FIG. 3 is a graph showing the valve opening characteristics at the ordinary temperature and the low temperature according to the first preferred embodiment.

Further, even when the operating temperature of the solenoid valve 1 is low, for example, at about −40° C., a variation of the load applied to the valve element 4 in the valve seating direction can be canceled by a variation of the spring load caused by the deformation of the adjusting screw 8. Thus, as shown in FIG. 3, the air flow rate can be controlled even at the low temperature like at the ordinary temperature.

The sealing loads are approximately equal to each other even at the low and ordinary temperatures. In this case, however, a difference between the air flow rates at the low and ordinary temperatures relative to the constant current to the solenoid is no greater than 30%.

[Second Embodiment]

Figure 4:
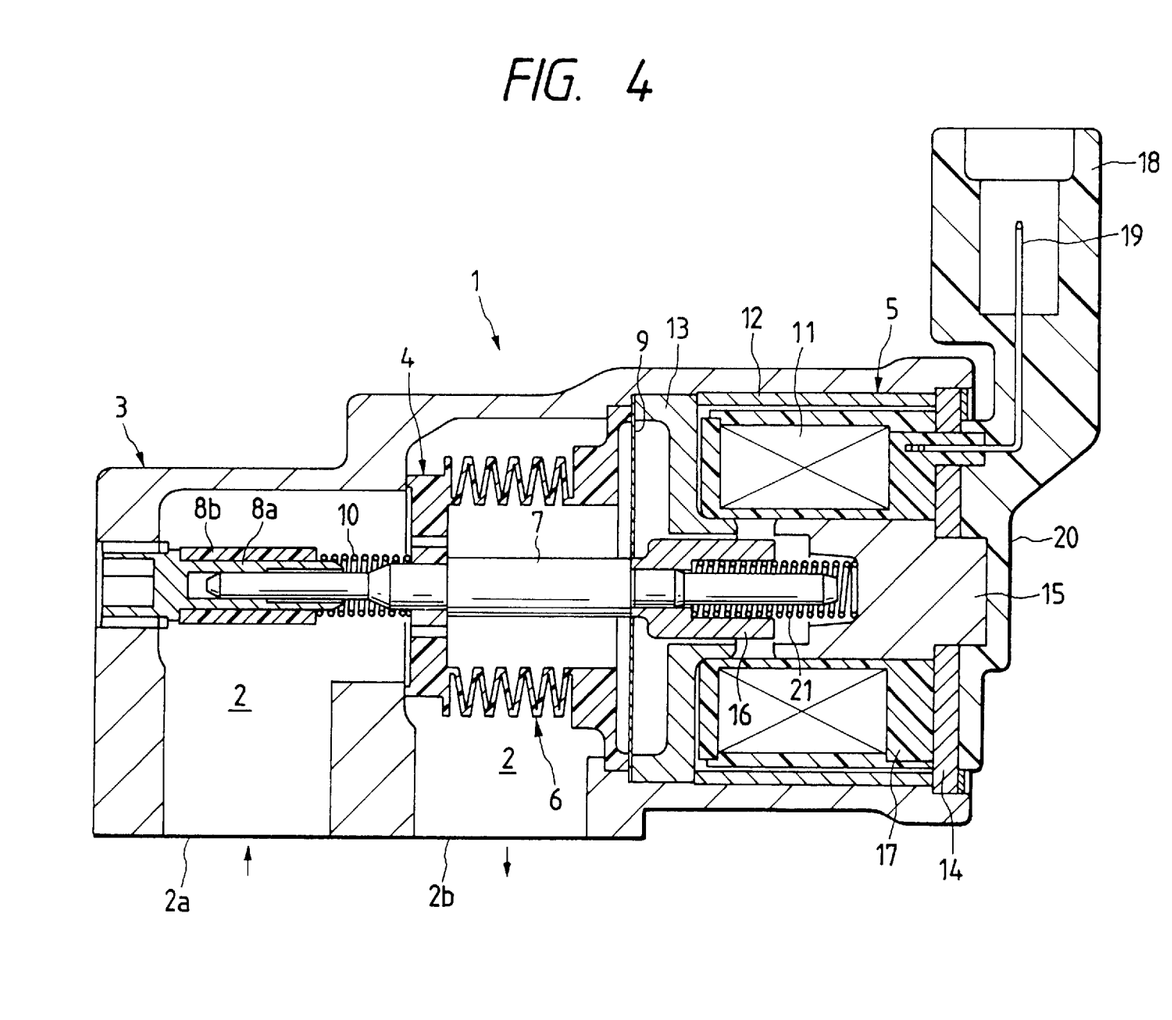
FIG. 4 is a sectional view showing the whole structure of a fluid control solenoid valve according to a second preferred embodiment of the present invention.

FIG. 4 is a sectional view showing the whole structure of a fluid control solenoid valve according to the second preferred embodiment.

In this embodiment, the adjusting screw 8 includes a bearing portion 8a for supporting the shaft 7 and a sleeve 8b for receiving the load from the spring 10. As shown in FIG. 4, the sleeve 8b is fitted over the bearing portion 8a. The sleeve 8b is made of resin having a large linear expansion coefficient, such as ethylene tetrafluoride resin or polyester elastomer.

In this embodiment, the load applied to the valve element 4 from the spring 10 is changed by axially deforming the sleeve 8b depending on the change in temperature. Thus, as in the foregoing first preferred embodiment, the sealing loads applied to the valve element 4 at the ordinary and high temperatures or at the ordinary and low temperatures can be rendered approximately equal to each other.

[Third Embodiment]

Figure 5:
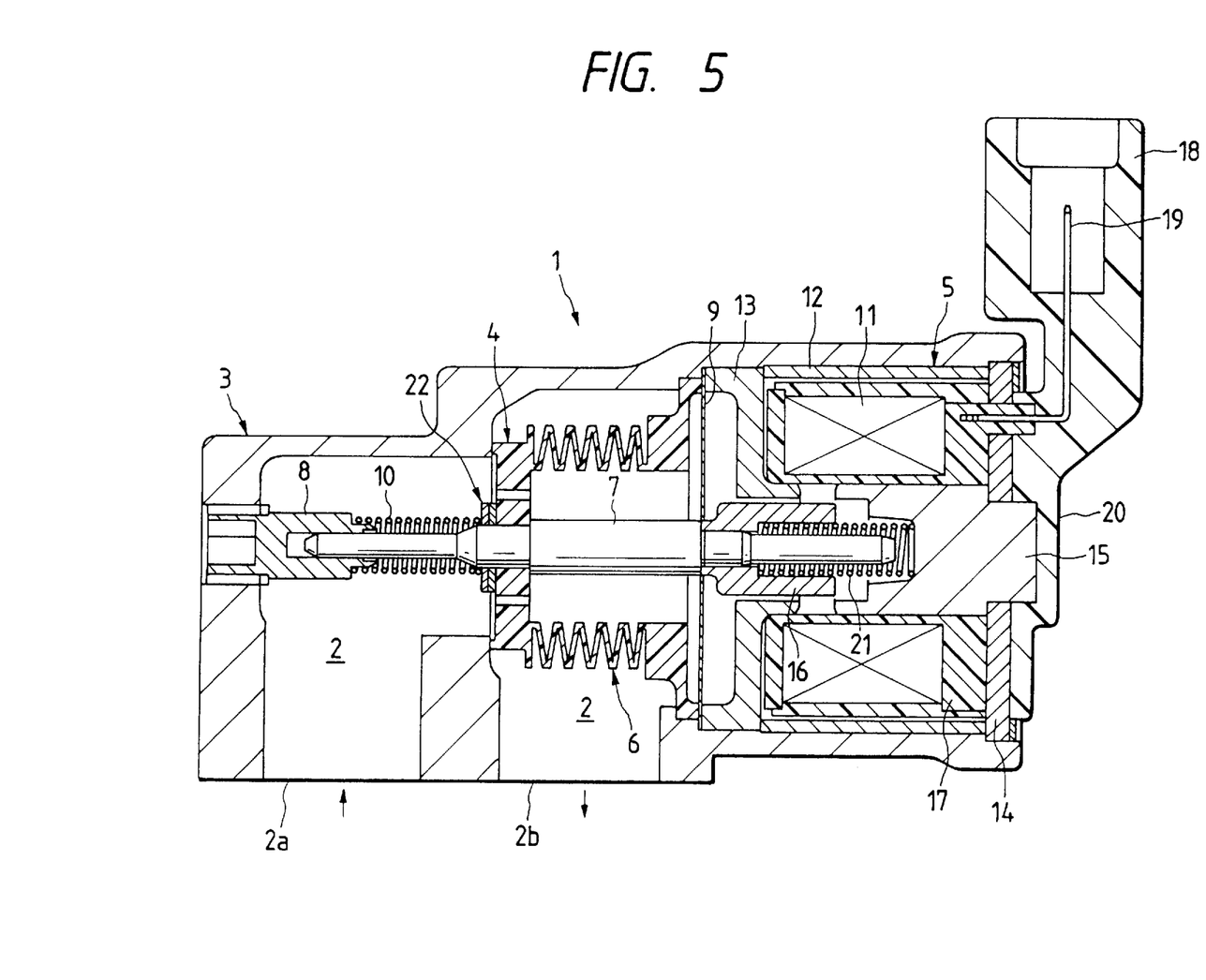
FIG. 5 is a sectional view showing the whole structure of a fluid control solenoid valve according to a third preferred embodiment of the present invention.

FIG. 5 is a sectional view showing the whole structure of a fluid control solenoid valve according to the third preferred embodiment.

In this embodiment, a spacer 22 made of bimetal is arranged between the spring 10 and the valve element 4 for receiving the load from the spring 10. With this arrangement, when the bimetal spacer 22 is deformed or bent in a displacing direction of the valve element 4 depending on the change in temperature, the load applied to the valve element 4 via the bimetal spacer 22 from the spring 10 is changed. For example, if one side of the bimetal spacer 22 facing the spring 10 is made of a material having a large linear expansion coefficient, the bimetal spacer 22 is bent toward the adjusting screw 8 at the high temperature so as to increase the load from the spring 10. Thus, the sealing loads applied to the valve element 4 can be rendered approximately equal to each other at the ordinary and high temperatures.

[Fourth Embodiment]

Figure 6:
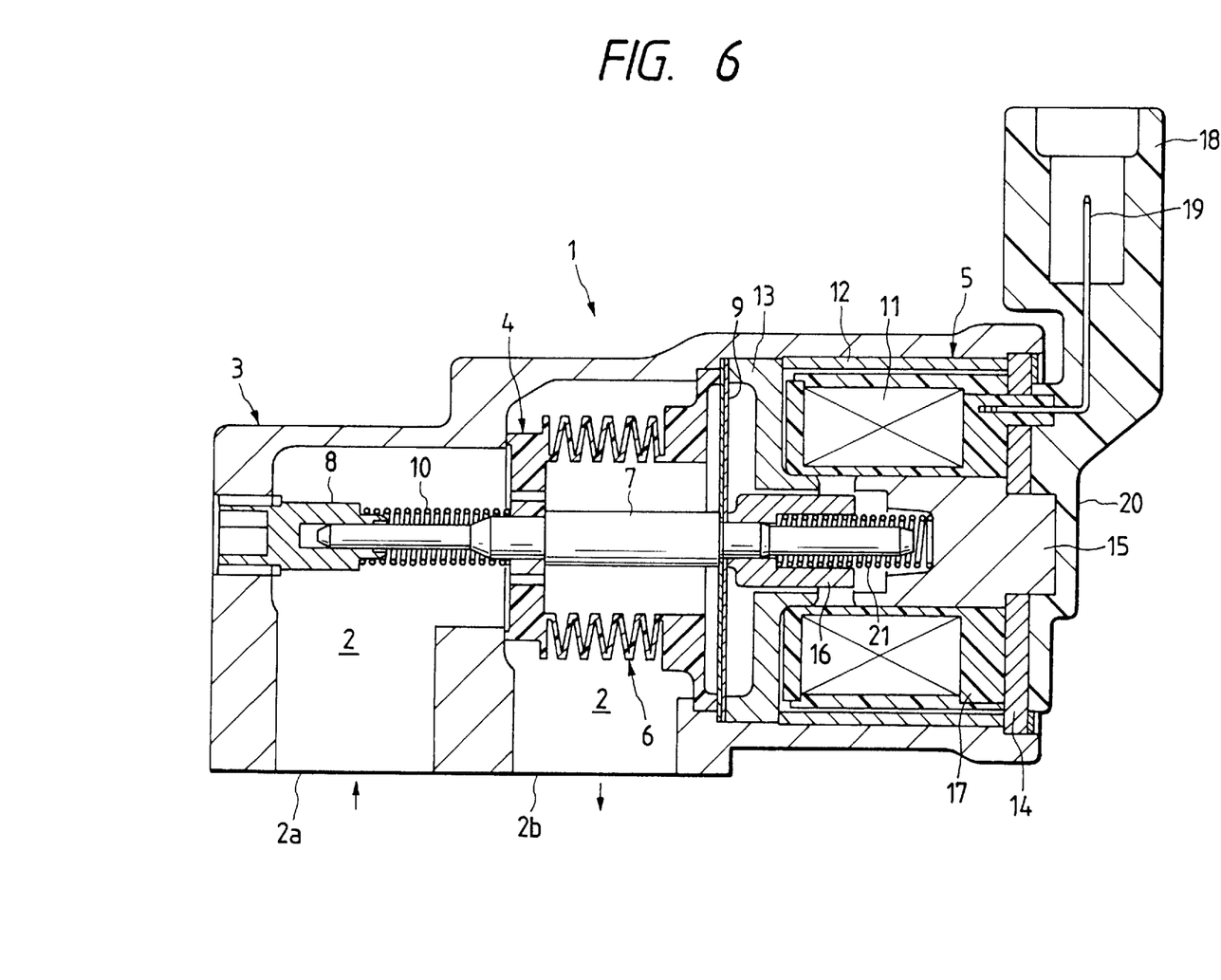
FIG. 6 is a sectional view showing the whole structure of a fluid control solenoid valve according to a fourth preferred embodiment of the present invention.

FIG. 6 is a sectional view showing the whole structure of a fluid control solenoid valve according to the fourth preferred embodiment.

In this embodiment, the plate spring 9 supporting the shaft 7 is made of bimetal. With this arrangement, when the bimetal plate spring 9 is deformed or bent in a displacing direction of the valve element 4 depending on the change in temperature, the deformation of the bimetal plate spring 9 is transmitted to the shaft 7 as a biasing force of the plate spring 9 so that the load applied to the valve element 4 is changed. For example, if one side of the bimetal plate spring facing the first plate 13 is made of a material having a large linear expansion coefficient, the bimetal plate spring 9 is bent toward the stator core 15 at the high temperature so as to urge the shaft 7 toward the stator core 15. This provides an effect similar to that where the load from the spring 10 is increased. Thus, the sealing loads applied to the valve element 4 can be rendered approximately equal to each other at the ordinary and high temperatures.

While the present invention has been described in terms of the preferred embodiments, the invention is not to be limited thereto, but can be embodied in various ways without departing from the principle of the invention as defined in the appended claims.

For example, in the foregoing preferred embodiments, the solenoid valve is used for controlling the air flow rate bypassing the throttle valve. On the other hand, the solenoid valve may also be used for controlling the air flow rate other than such a bypass air flow rate.

What is claimed is:

1. A fluid control solenoid valve comprising:
    a fluid passage having a first passage for introducing fluid, a second passage communicating with said first passage for discharging the fluid, and a valve seat provided in said fluid passage between said first and second passages;
    a bellows having a valve element for closing said fluid passage when seated on said valve seat and opening said fluid passage when separated from said valve seat, and a retractable bellows portion, said valve element and said bellows portion forming a pressure chamber into which a pressure of said first passage is introduced;
    a first biasing member for urging said valve element in a first direction away from said valve seat;
    a second biasing member for urging said valve element in a second direction toward said valve seat;
    a shaft for moving said valve element in said first or second direction;
    driving means for moving said valve element in said first direction via said shaft against a biasing force urging said valve element in said second direction; and
    load correcting means for correcting a load applied to said valve element so as to cause sealing loads to be approximately equal to each other at an ordinary temperature and at a temperature other than said ordinary temperature, said sealing load causing said valve element to be seated onto said valve seat.

2. The fluid control solenoid valve according to claim 1, wherein said temperature other than said ordinary temperature is a given high temperature.

3. The fluid control solenoid valve according to claim 1, wherein said temperature other than said ordinary temperature is a given low temperature.

4. The fluid control solenoid valve according to claim 1, wherein said load correcting means is deformed in a displacing direction of said valve element depending on a temperature change relative to the ordinary temperature so as to correct the load applied to said valve element from said first biasing member.

5. The fluid control solenoid valve according to claim 4, wherein said load correcting means adjusts a set load of said first biasing member.

6. The fluid control solenoid valve according to claim 4, wherein said load correcting means is a load receiving member for receiving the load, at a side of said valve element, from said first biasing member.

7. The fluid control solenoid valve according to claim 6, wherein said load receiving member is made of bimetal.

8. The fluid control solenoid valve according to claim 1, wherein said load correcting means is a plate spring made of bimetal, said bimetal plate spring supporting said shaft so as to be axially movable.

9. A fluid control solenoid valve comprising:
    a fluid passage having a first passage for introducing fluid, a second passage communicating with said first passage for discharging the fluid, and a valve seat provided in said fluid passage between said first and second passages;
    a bellows having a valve element for closing said fluid passage when seated on said valve seat and opening said fluid passage when separated from said valve seat, and a retractable bellows portion, said valve element and said bellows portion forming a pressure chamber into which a pressure of said first passage is introduced;
    a first biasing member for urging said valve element in a first direction away from said valve seat;
    a second biasing member for urging said valve element in a second direction toward said valve seat;
    a shaft for moving said valve element in said first or second direction;
    driving means for moving said valve element in said first direction via said shaft against a biasing force urging said valve element in said second direction; and
    load correcting means for preventing a change in sealing load to be caused due to a change in temperature, by changing a load applied to said valve element depending on a temperature, said sealing load causing said valve element to be seated onto said valve seat.

* * * * *